(12) United States Patent
Takase (10) Patent No.: US 7,716,341 B2
(45) Date of Patent: May 11, 2010

(54) SERVER APPARATUS AND SYSTEM FOR PROVIDING DEVICE DRIVERS AND APPLICATION SOFTWARES

(75) Inventor: Yuzuru Takase, Yokohama (JP)

(73) Assignee: Panasonic Corporation, Osaka (JP)

( * ) Notice: Subject to any disclaimer, the term of this patent is extended or adjusted under 35 U.S.C. 154(b) by 561 days.

(21) Appl. No.: 11/277,240

(22) Filed: Mar. 23, 2006

(65) Prior Publication Data

US 2006/0224705 A1    Oct. 5, 2006

(30) Foreign Application Priority Data

Mar. 30, 2005    (JP) ............................. 2005-096921

(51) Int. Cl.
*G06F 15/16* (2006.01)
(52) U.S. Cl. ..................................................... 709/227
(58) Field of Classification Search .................. 709/221
See application file for complete search history.

(56) References Cited

U.S. PATENT DOCUMENTS 5,931,909 A * 8/1999 Taylor ........................ 709/221

2003/0200292 A1* 10/2003 Kemp et al. ................. 709/222
2004/0225733 A1* 11/2004 Tesink et al. ................ 709/225
2005/0066019 A1*  3/2005 Egan et al. .................. 709/223
2005/0160157 A1*  7/2005 Collier et al. ............... 709/222

FOREIGN PATENT DOCUMENTS

JP    2004-110678    4/2004

OTHER PUBLICATIONS

English language Abstract of JP 2004-110678.

* cited by examiner

*Primary Examiner*—Vivek Srivastava
*Assistant Examiner*—Xiang Yu
(74) *Attorney, Agent, or Firm*—Greenblum & Bernstein, P.L.C.

(57) ABSTRACT

Management information for specifying use environments of devices and application softwares at a plurality of user terminals is created at an administrator terminal. User-specific configuration information is generated at a server according to the management information obtained from the administrator terminal. The user-specific configuration information is referenced by installation support programs when a use environment of the devices and application softwares is built at a user terminal. The user-specific configuration information is distributed from the server to the user terminal, together with device drivers of the devices, the application softwares and the installation support programs.

19 Claims, 11 Drawing Sheets

Installation object management list

| ID | Name | IP | Color/monochrome | Double-sided/single-sided | NUP | Security | Installer path |
|---|---|---|---|---|---|---|---|
| P1 | Monochrome printer 1 | 192.168.1.10 | | Double-sided | | | /driver/pdrv1 |
| P2 | Color printer 1(monochrome) | 192.168.1.20 | Monochrome | Double-sided | | ON | /driver/pdrv2 |
| P3 | Monochrome printer 2 | 192.168.1.30 | | Single-sided | 2 | | /driver/pdrv1 |
| P4 | Color printer 1(color) | 192.168.1.20 | Color | Single-sided | | | /driver/pdrv2 |
| S1 | Scanner 1 | 192.168.1.20 | Color | | | ON | /driver/scan1 |
| A1 | OCR software | | | | | | /apl/ocr1 |
| A2 | Graphic software | | | | | | /apl/graph |

Fig.5

User management list

| Name | Management ID | Use printer/scanner | Application | Common key | E-mail address |
|---|---|---|---|---|---|
| User A | 111111 | P1 | | qwweertyy | usera@office.com |
| User B | 222222 | P1 P2 S1 | A1 | yeueioewpw | userb@office.com |
| User C | 123456 | P1 P4 S1 | A1 A2 | dhhwywiwk | userc@office.com |
| User D | 765432 | P2 S1 | A2 | okiuyrtee | userd@office.com |
| User E | 981223 | P2 P3 S1 | A1 | iwoweurhhf | usere@office.com |
| User F | 678342 | P3 | | ywuwjjjqww | userf@office.com |

Fig.6(A)

User-specific configuration file for user A

```
[Printer]
  [amount] 1
    [1]
      [name] Monochrome printer 1
      [IP address] 182.168.1.10
      [duplex]        <------------ Specifying double-sided printing
      [ID] 1111111    <------------ Management ID
      [dir] /driver/pdrv1  <------- Installer path
```

Fig.6(B)

User-specific configuration file for user C

```
[Printer]
  [amount] 2        <------------ Number of printers
    [1]
      [name] Monochrome printer 1
      [IP address] 182.168.1.10
      [duplex]
      [ID] 123456
      [dir] /driver/pdrv1
    [2]
      [name] color printer 1(color)
      [IP address] 182.168.1.20
      [color]       <------------ Color printing
      [ID] 123456
      [SecKey] dhhwywiwk  <------ Common key distributed
      [dir] /driver/pdrv2           beforehand
[Scanner]
  [amount] 1
    [1]
      [name] scanner 1
      [IP address] 182.168.1.20
      [ID] 123456
      [SecKey] dhhwywiwk  <------ Common key distributed
      [dir] /driver/scan1           beforehand
[Application]
  [amount] 2
    [1]
      [name] OCR software
      [dir] /apl/ocr1
    [2]
      [name] Graphic software
      [dir] /apl/graph
```

Fig.7(A)

Screen of notification e-mail to user A

Fig.7(B)

Screen of notification e-mail to user C

Installation status management list

| Name | E-mail address | E-mail notification | Installation | Re-send |
|---|---|---|---|---|
| User A | usera@office.com | Completed(2005/02/14) | Completed(2005/02/14) | |
| User B | userb@office.com | Completed(2005/02/14) | Completed(2005/02/15) | |
| User C | userc@office.com | Completed(2005/02/14) | Not completed | Re-send |
| User D | userd@office.com | Completed(2005/02/14) | Not completed | Re-send |
| User E | usere@office.com | Completed(2005/02/14) | Completed(2005/02/16) | |
| User F | userf@office.com | Completed(2005/02/14) | Completed(2005/02/14) | |

SERVER APPARATUS AND SYSTEM FOR PROVIDING DEVICE DRIVERS AND APPLICATION SOFTWARES

BACKGROUND OF THE INVENTION

1. Field of the Invention

The present invention relates to a server apparatus and a system for providing device drivers and application softwares. The server apparatus and the system for providing device drivers and application softwares are used to provide, from the server apparatus to a user terminal, programs and data that are necessary for using various devices, such as printers, and application softwares at the user terminal.

2. Description of Related Art

A printing system, in which a plurality of user terminals (consisting of PCs) and a plurality of printers are connected via a network and the printers are shared by users using the user terminals, is widely used in offices where routine office works are performed. However, when the number of printers connected to the network is large, it can be troublesome to obtain a device driver compatible with a printer assigned to each user. It is therefore desirable to have a system in which a suitable device driver can be easily obtained.

To address such demand, a system for providing a required device deriver to a user terminal by using a web server has been disclosed (see Related Art 1). In particular, in this system, a function for building a device driver according to specification information of a user terminal is implemented in the web server, and a predetermined device driver possessing a user-interface and functions that are suitable for a use environment of the user terminal can be provided to the user terminal at low cost.

[Related Art 1] Japanese Patent Laid Open Publication 2004-110678

However, according to the above-mentioned conventional technology, after a user terminal is provided with a device driver from the web server, a configuration process, such as a process for specifying printers assigned to a user, is still necessary in order to build a use environment required at the user terminal. In particular, when the number of printers connected to the network is large, or when the types of usage of the printers are restricted, the configuration process can be cumbersome. It is therefore desirable to have a system in which installation and configuration of a device driver can be easily performed at a user terminal.

Further, when a use environment at a user terminal is configured in such a way as to restrict the types of usage of printers according to work assignments of a user, for example, to permit only predetermined users to use expensive color printing, or to require all users to use double-sided printing for the purpose of paper saving, it is effective in reducing the overall cost of the printing system. However, when the installation of device drivers necessary for using the printers and the configuration for building the use environment are performed freely at user's choice, it is no longer possible to manage the printers in a way an administrator would like to operate. It is therefore desirable to have a system in which the use environment of the printers at a user terminal can be suitably built according to specifications given by the administrator.

When installing an application software to a user terminal, in the same way as in the case of a device driver described-above, an effort is required to obtain from the administrator the application software and information required for installing the software. It is therefore desirable to have a system in which the installation of the application software to the user terminal can be easily performed. Further, in order to properly manage the system so that the installation of an application software to a user terminal will not be performed freely at user's choice, the burden on the administrator side is increased. It is therefore desirable to have a system in which the use environment of the application software at a user terminal is suitably built according to specifications given by the administrator.

SUMMARY OF THE INVENTION

The present invention is provided to resolve the above-described problems associated with the conventional technology. The main purpose of the present invention is to provide a server apparatus and a system for providing device drivers and application softwares. In this system, the installation of device drivers for various devices, such as printers, and of application softwares at a user terminal can be easily performed. At the same time, the use environment of the devices and the application softwares is suitably built according to specifications given by an administrator.

In order to achieve the above-described objective, the system for providing device drivers according to the present invention includes a plurality of user terminals, an administrator terminal and a server apparatus. The user terminals share a plurality of devices on a network. The administrator terminal creates management information for respectively specifying use environments of the devices at the user terminals. The server apparatus generates user-specific configuration information according to the management information obtained from the administrator terminal, and distributes, to the user terminals, the user-specific configuration information together with device drivers controlling the devices and installation support programs. The user-specific configuration information is referenced by the installation support programs when the use environments of the devices are built at the user terminals.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 6 (A) shows the content of a user-specific configuration file distributed from the server to the user terminal of user A shown in FIG. 2;

FIG. 6 (B) shows the content of a user-specific configuration file distributed from the server to the user terminal of user C shown in FIG. 2;

FIG. 7 (A) shows a screen displaying an address notification e-mail on the user terminal of user A shown in FIG. 2;

FIG. 7 (B) shows a screen displaying an address notification e-mail on the user terminal of user C shown in FIG. 2;

DETAILED DESCRIPTION OF PREFERRED EMBODIMENTS

The embodiments of the present invention are explained in the following with reference to the above-described drawings.

Figure 1:
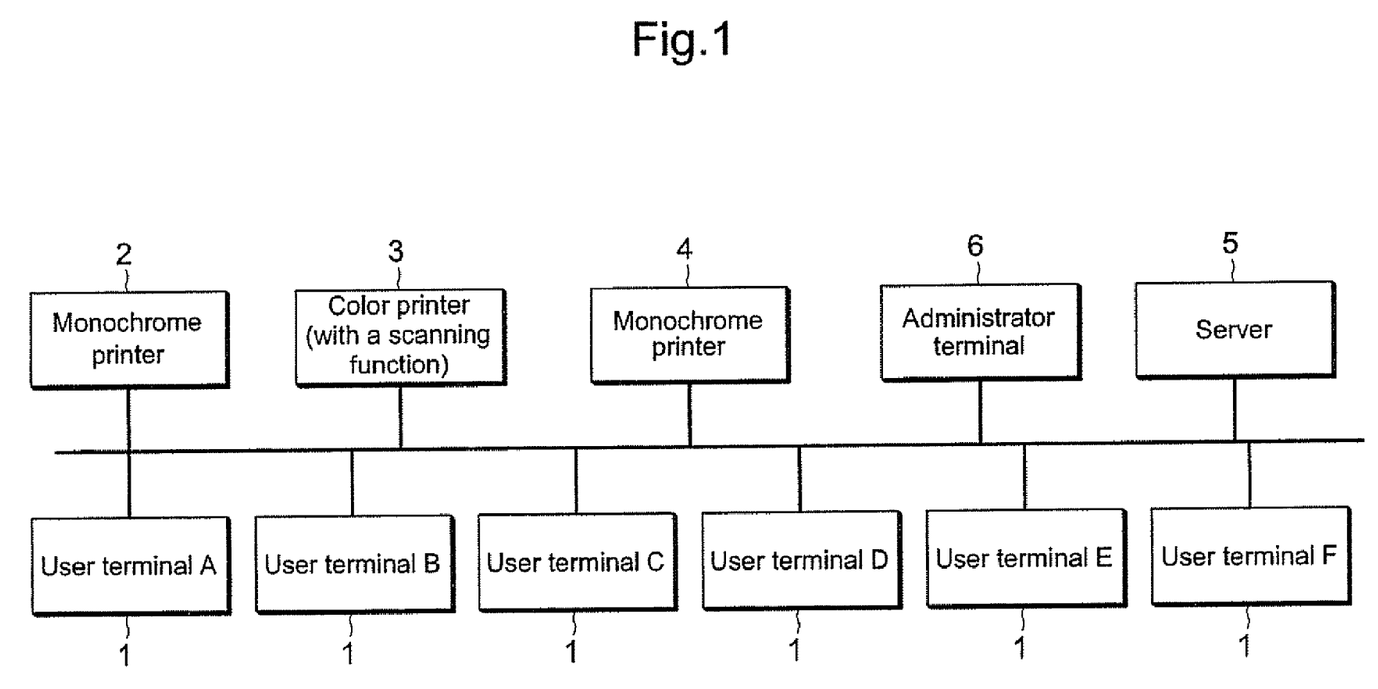
FIG. 1 is a block diagram showing a network system to which the present invention is applied.

FIG. 1 is a block diagram showing a network system to which the present invention is applied. In this system, a plurality of user terminals 1 share a plurality of printers 2, 3 and 4 in an office. User terminals 1, consisting of PCs, and printers (devices) 2, 3 and 4 are connected via a network (LAN). Printers 2, 3 and 4 perform printing in response to requests from user terminals 1. In particular, the first and the third printers 2 and 4 possess a monochrome printing function, and the second printer 3 possesses a color printing function and a scanning function.

Device drivers for printers 2, 3 and 4 are installed in each of user terminals 1. And, application softwares such as ORC software and graphic software are installed in those of user terminals 1 that are permitted by an administrator to use the application softwares.

User terminals 1 are connected via the network to server 5, which distributes device drivers and application softwares, as well as installers (installation support programs) thereof. User terminals 1 can download required programs and data from server 5 and install device drivers and application softwares in user terminals 1.

Further, server 5 is connected via the network to administrator terminal 6. Administrator terminal 6 manages use environments of printers 2, 3 and 4 and the application softwares at user terminals 1, the use environments being built through the installation of the device drivers and the application softwares at user terminals 1. Predetermined configuration information is generated at server 5 according to conditions specified by the administrator. Based on the predetermined configuration information, the installers perform installation processes at user terminals 1, thereby building administrator's specification-based use environments of the printers and application softwares at user terminals 1.

Figure 2:
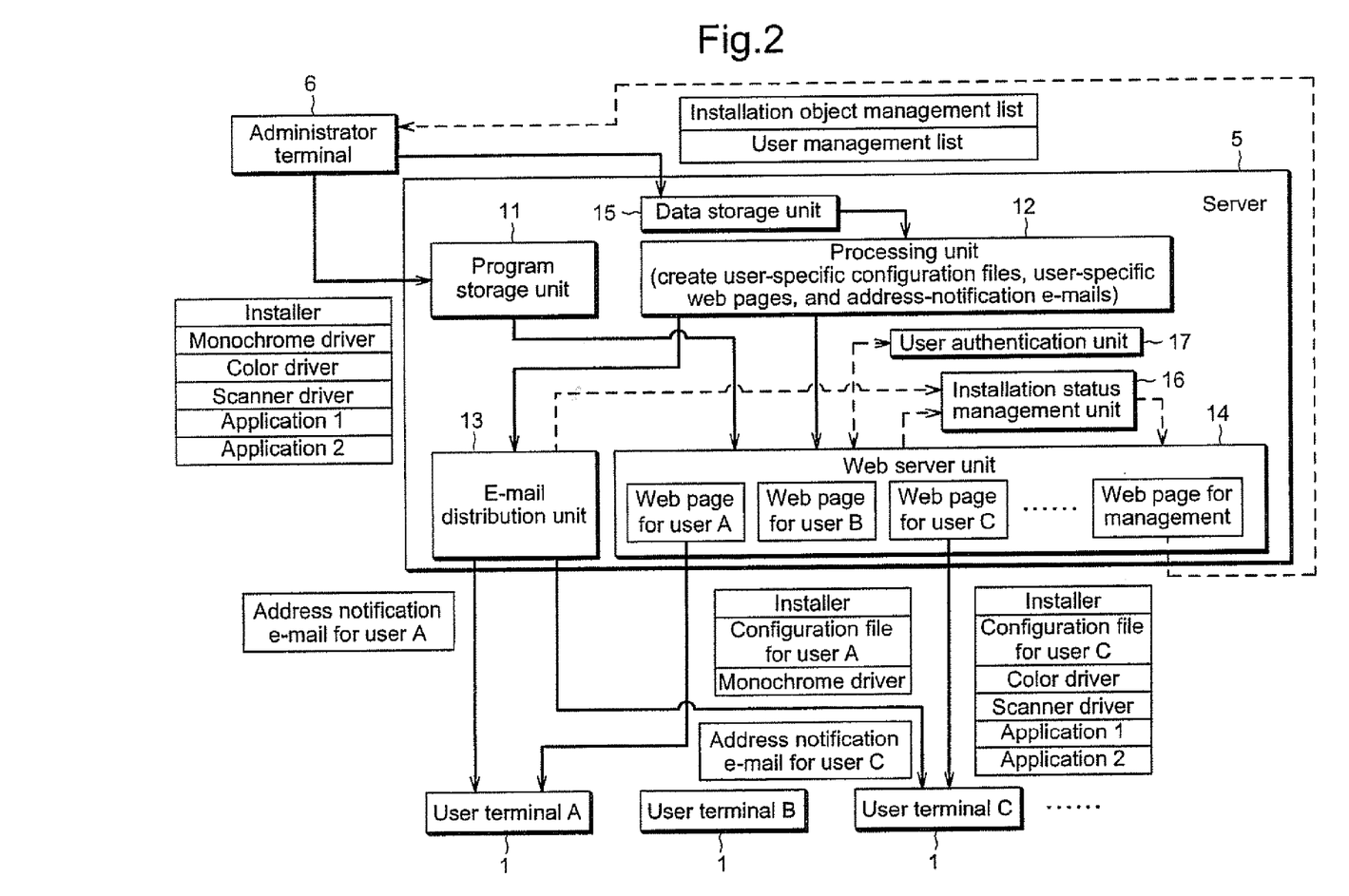
FIG. 2 is a block diagram showing how a user terminal obtains necessary programs, such as device drivers, and data in the network system shown in FIG. 1.

FIG. 2 is a block diagram showing how a user terminal obtains necessary software programs, such as device drivers, and other data, in the network system shown in FIG. 1. At administrator terminal 6, an installation object management list (management information) and a user management list (management information) are created by the administrator. The installation object management list specifies, for each of the devices and application softwares, conditions related to the use environments of the devices and application softwares built at user terminals 1, the device drivers and application softwares being installation objects. The user management list specifies, for each user, the conditions related to the use environments at user terminals 1.

At administrator terminal 6, device drivers and installers thereof for printers 2, 3 and 4 are obtained from a memory media such as CD-ROMs provided by makers of printers 2, 3 and 4 or from websites, and application softwares and installers thereof are also obtained. A process for uploading the device drivers, application softwares and installers thereof to server 5 is performed at administrator terminal 6.

Server 5 includes program storage unit 11, processing unit 12, e-mail distribution unit 13 and web server unit 14. Program storage unit 11 stores the device drivers, application softwares and installers thereof, obtained from administrator terminal 6. Processing unit 12 creates user-specific configuration files (user-specific configuration information), user-specific web pages and address notification e-mails, based on the installation object management list and user management list obtained from administrator terminal 6.

When device drivers are installed in user terminals 1 by installers, the user-specific configuration files provide, to the installers, information regarding permission for the use of the devices and information for configuring various parameters that specify operating conditions of the devices. When application softwares are installed in user terminals 1 by installers, the user-specific configuration files provide, to the installers, information regarding permission for the use of the application softwares by user terminals 1. By generating the user-specific configuration files based on the administrator-prepared installation object management list and user management list, the use environments of printers 2, 3 and 4 and application softwares are built at user terminals 1 according to the conditions specified by the administrator.

A user-specific web page is utilized for the use to download device drivers, application softwares, installers thereof, and a user-specific configuration file. An address notification e-mail is used to notify a corresponding user terminal 1 of the address (URL) of the user-specific web page.

E-mail distribution unit 13 distributes, to user terminals 1, address notification e-mails created by processing unit 12. Web server unit 14 publishes user-specific web pages created by processing unit 12, and processes downloading of required programs and data in the form of dialogues with user terminals 1.

Figure 3:
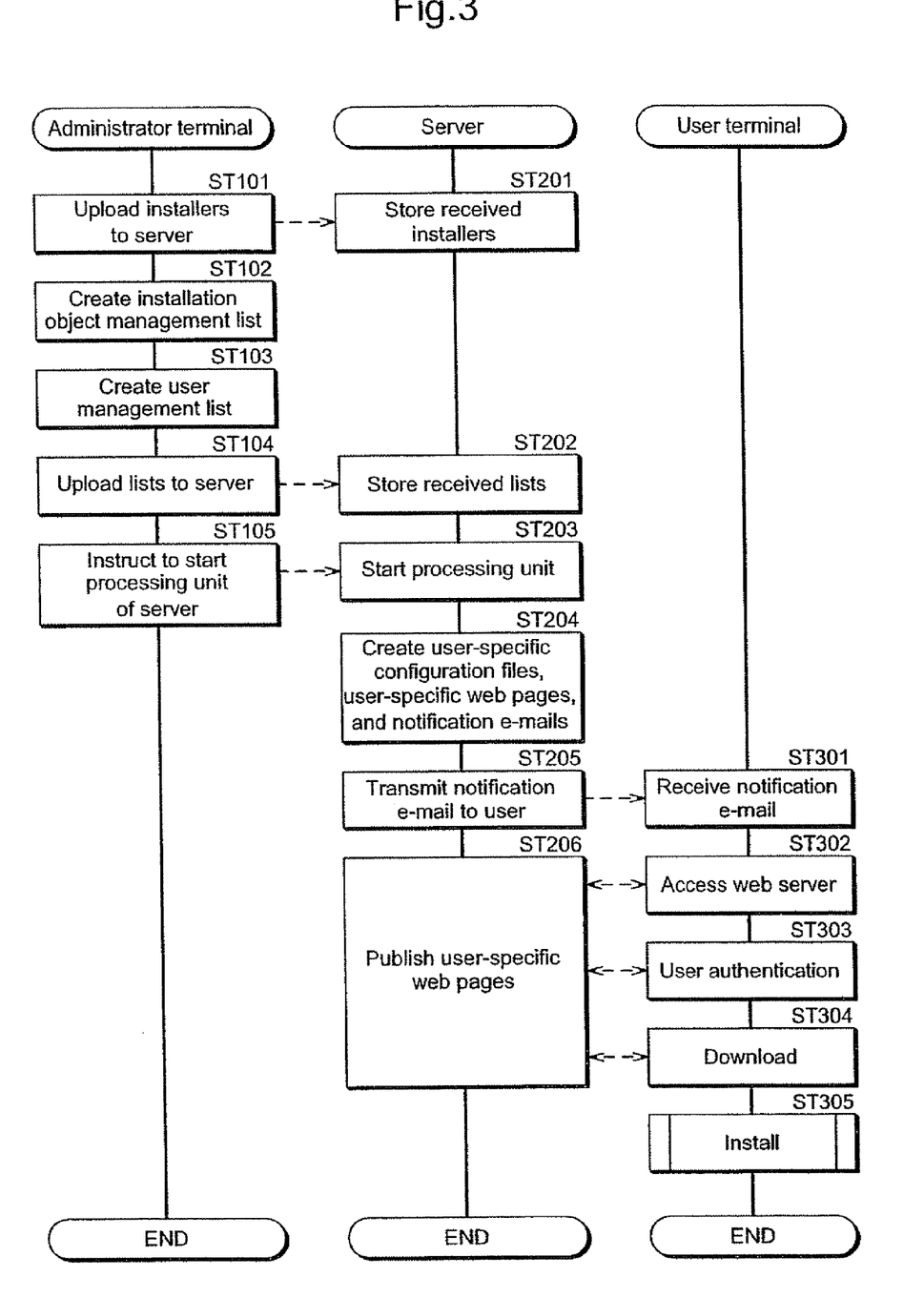
FIG. 3 is a flow chart showing procedures performed at the administrator terminal, the server and one of the user terminals shown in FIG. 2.

FIG. 3 is a flow chart showing procedures performed at the administrator terminal, the server and one of the user terminals shown in FIG. 2. First, at administrator terminal 6, device drivers, application softwares and installers thereof are uploaded to server 5 (Step 101). At server S, received programs are stored in program storage unit 11 (Step 201).

Next, at administrator terminal 6, an installation object management list and a user management list are created (Steps 102 and 103). Then, the resulting installation object management list and user management list are uploaded to server 5 (Step 104). At server 5, the received installation object management list and user management list are stored in data storage unit (Step 202).

Next, from administrator terminal 6, an instruction is given to server 5 to start processing unit 12 (Step 105). In response to the instruction, processing unit 12 of server 5 starts (Step 203). In processing unit 12, based on the installation object management list and user management list stored in data storage unit 15, a process for creating user-specific configuration files, user-specific web pages and address notification e-mails is performed (Step 204). Then, from e-mail distribution unit 13 of server 5, address notification e-mails are transmitted to user terminals 1 (Step 205). And, in web server unit 14 of server 5, user-specific web pages are published (Step 206).

Next, at user terminal 1, upon receiving an address notification e-mail from server 5 (Step 301), the user accesses web server unit 14 of server 5 according to the address described in the address notification e-mail and opens a user-specific web page (Step 302). On the user-specific web page, a user authentication process is first performed based on a user ID (Step 303). When the user authentication is successful, device drivers, application softwares and installers thereof, as well as a user-specific configuration file, are downloaded (Step 304). The installers are then executed at user terminal 1 to install the device drivers and application softwares, and a configuration process is performed at the same time to build a use environment based on the information contained in the user-specific configuration file (Step 305).

Figure 4:
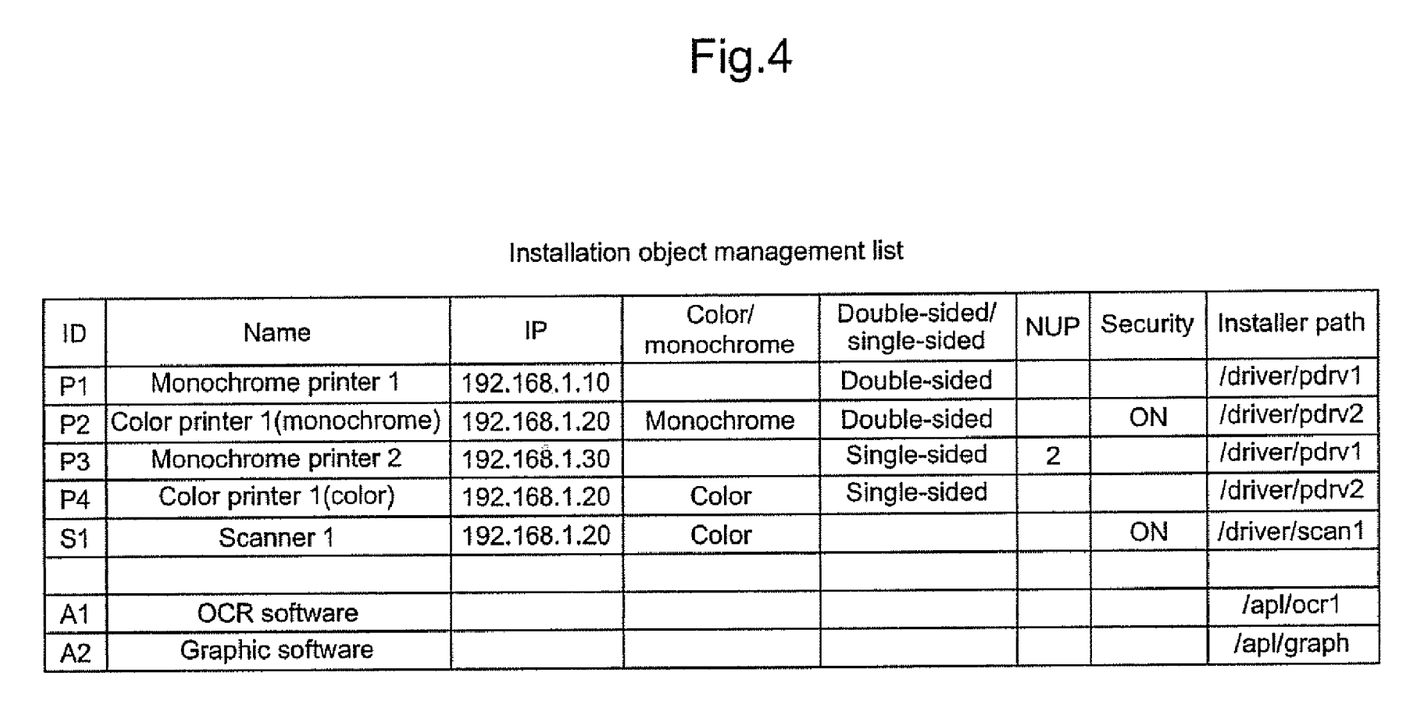
FIG. 4 shows the content of an installation object management list sent from the administrator terminal to the server shown in FIG. 2.

FIG. 4 shows the content of an installation object management list sent from the administrator terminal to the server shown in FIG. 2. The installation object management list contains specifications regarding device drivers and application softwares, which are installation objects to be installed in user terminals 1. The installation object management list is created at administrator terminal 6 in Step 102, as shown in FIG. 3, and is uploaded to server S in Step 104.

Items provided in the installation object management list include identification information (ID) for each of devices and application softwares as installation objects, a name for each of devices and application softwares, an IP address assigned to each device, a specification regarding color printing or monochrome printing, a specification regarding double-sided printing or single-sided printing, a specification regarding a collective printing (NUP) function that allows printing a plurality of pages on a single sheet of paper, a (security) specification regarding whether the use is limited to specific users, and an installer path indicating a location of an installer.

In the current example, the first and third printers 2 and 4, which possess a monochrome printing function, are registered as "monochrome printer 1" (P1) and "monochrome printer 2" (P3), respectively. Since the first and third printers 2 and 4 are of the same model, the same device driver is used. Further, the second printer 3, which possesses a color printing function and a scanning function, is registered in three separate modes including a mode (P2) in which only the monochrome printing function is used by using a monochrome printer driver, a mode (P4) in which the color printing function is used by using a color printer driver, and a mode (S1) in which the scanning function is used by using a scanner driver. Physically the same printer is virtually treated as a plurality of devices. As application softwares, OCR software and graphic software are registered.

The installation object management list is processed at server 5 as a file in CSV format. The installation object management list can be created at administrator terminal 6 by using a spreadsheet software or the like.

Figure 5:
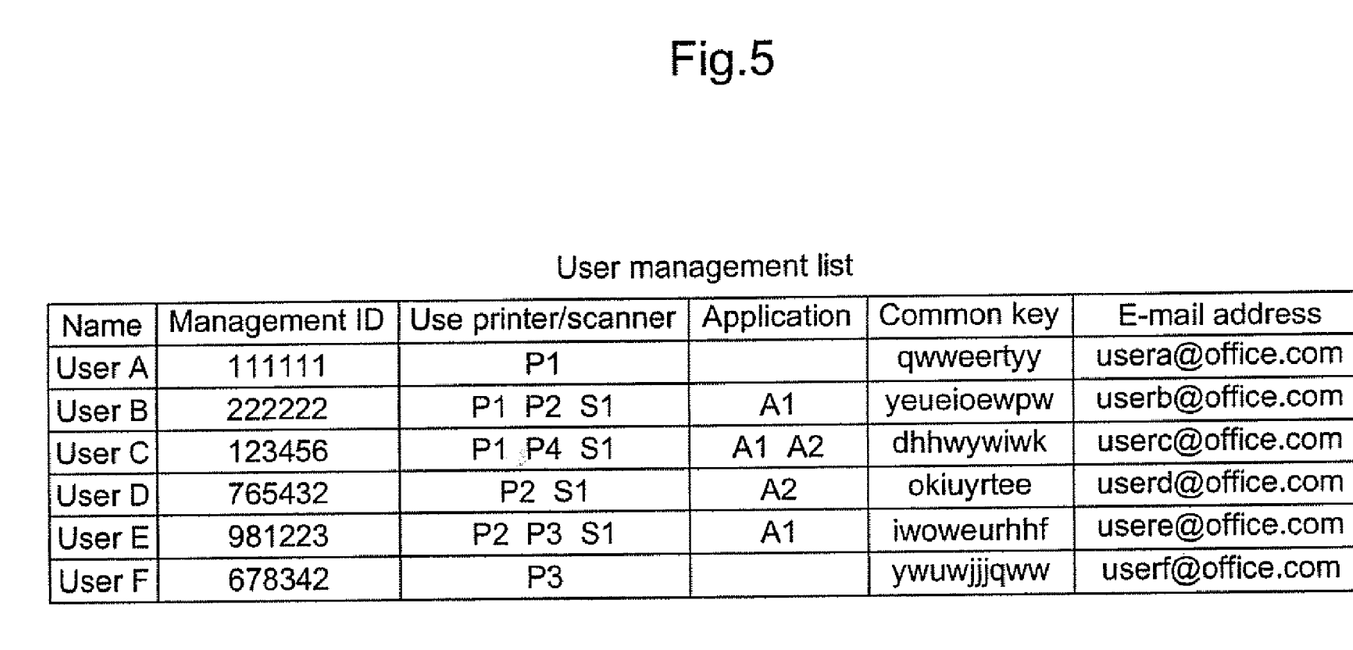
FIG. 5 shows the content of a user management list sent from the administrator terminal to the server shown in FIG. 2.

FIG. 5 shows the content of a user management list sent from the administrator terminal to the server shown in FIG. 2. The user management list registers specifications related to each user. The user management list is created at administrator terminal 6 in Step 103, as shown in FIG. 3, and is uploaded to server 5 in Step 104.

Items provided in the user management list include a user name, identification information (management ID) for managing (checking) the use of the device and the like by each user, identification information (use printer/scanner) for devices that a user is permitted to use, identification information for application softwares that a user is permitted to use, information necessary for an encrypted communication, for example, information (a common key) for decrypting encrypted data, and an e-mail address which is used as a destination address for an address notification e-mail. In the encrypted communication, IPSec and the like are used to perform secured downloading of installers, application softwares and the like and to perform secured transmission of printing and scanning data, the downloading being performed between server 5 and user terminals 1, and the transmission of printing and scanning data being performed between printers 2, 3 and 4 and user terminals 1.

In the current example, user A is assigned the first printer (P1) and is not permitted to use application softwares. User C is assigned the first printer (P1), the mode (P4) of the second printer in which the color printing function is used, and the mode (S1) of the second printer in which the scanning function is used. Only user C is permitted to perform color printing using the second printer. Further, user C is permitted to use the OCR software (A1) and the graphic software (A2).

The user management list, in the same way as for the installation object management list, is processed at server 5 as a file in CSV format, and can be created at administrator terminal 6 by using a spreadsheet software or the like.

Figure 6A:
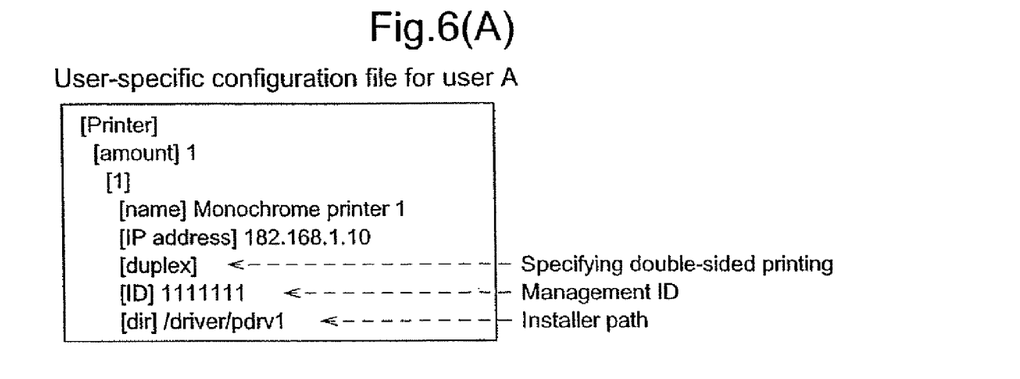
Figure 6B:
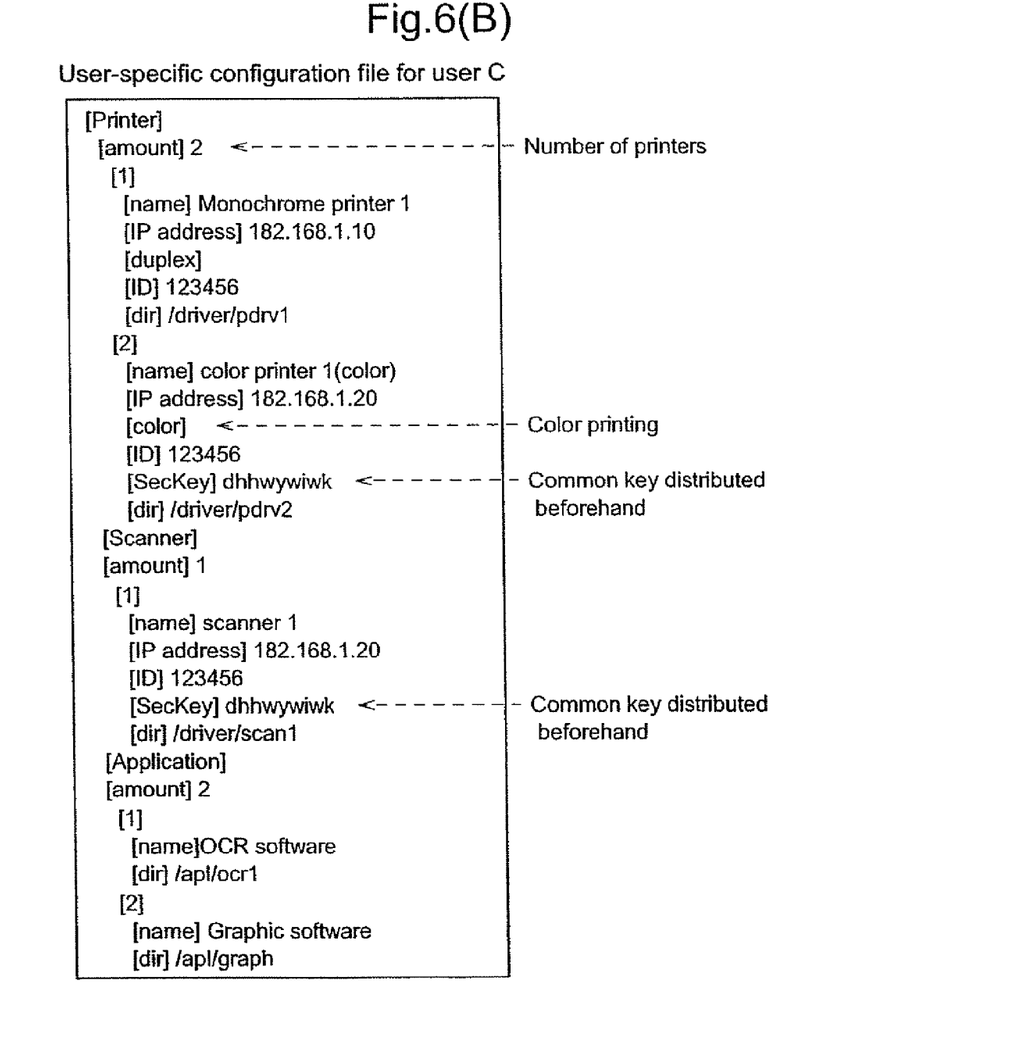

FIG. 6(A) shows the content of a user-specific configuration file distributed from the server to the user terminal of user A shown in FIG. 2. FIG. 6(B) shows the content of a user-specific configuration file distributed from the server to the user terminal of user C shown in FIG. 2. The user-specific configuration file (configuration file, configuration information) specifies device drivers and application softwares to be installed in user terminal 1, and also provides information for specifying various parameters that specify operating conditions of the devices. The user-specific configuration file is created at server 5 in Step 204, as shown in FIG. 3, and downloaded to user terminal 1 in Step 304, and is referenced at user terminal 1 in Step 305 when the installers are executed, thereby building a required use environment of the devices and application softwares.

In the user-specific configuration file for user A shown in FIG. 6(A), based on the registration content related to user A in the user management list shown in FIG. 5, the first printer is specified as one device that user A is permitted to use. The management ID (111111) of user A is also specified in the user-specific configuration file for user A. Further, based on the registration content related to the first printer (P1) in the installation object management list shown in FIG. 4, the IP address (182.168.1.10) of the first printer, double-sided printing, and an installer path are specified in the user-specific configuration file for user A.

In the user-specific configuration file for user C shown in FIG. 6(B), based on the registration content related to user C in the user management list shown in FIG. 5, the first printer (P1), the mode (P4) of the second printer using a color printing function and the mode (S1) of the second printer using a scanning function are specified as devices that user C is permitted to use. And, OCR software (A1) and graphic software (A2) are specified as application softwares that user C is permitted to use. Further, the management ID (123456) of user C is also specified in the user-specific configuration file for user C.

Further, based on the registration content related to the first printer (P1), the mode (P4) of the second printer using a color printing function and the mode (S1) of the second printer using a scanning function in the installation object management list shown in FIG. 4, the IP addresses (182.168.1.10, 182.168.1.20) of the devises, double-sided printing using the first printer, color printing using the second printer, and installer paths for the installers of the device drivers corresponding to the devices and of the OCR software and graphic software are specified in the user-specific configuration file for user C.

Further, in order to surely prevent installation of drivers on user terminals that are not permitted to use the mode (P4) of the second printer using a color printing function and the mode (S1) of the second printer using a scanning function, the downloading of the required programs and data is performed via encrypted communications. Common keys (dhhwywiwk) for decoding downloaded data at the user terminal are specified in the user-specific configuration file for user C.

In the example described above, configuration items that are important for management purpose, such as items related to color printing and double-sided printing, are registered in the installation object management list, as shown in FIG. 4. The installers perform configuration processes at user terminals by referencing the user-specific configuration files that are generated based on the installation object management list. Further, it is possible to adapt a configuration in which, as a default, users are permitted to make changes to the configuration set by the installers. However, in order to enhance the effectiveness of management, it is preferred that changes cannot be made at least to those configuration items that are important for management purpose, such as items related to color-printing, while, for users convenience, changes can be made, as a default, to those configuration items that are less important for management purpose, such as items related to double-sided printing and single-sided printing, and items related to collective printing in which a plurality of pages are printed on a single sheet.

Figure 7A:
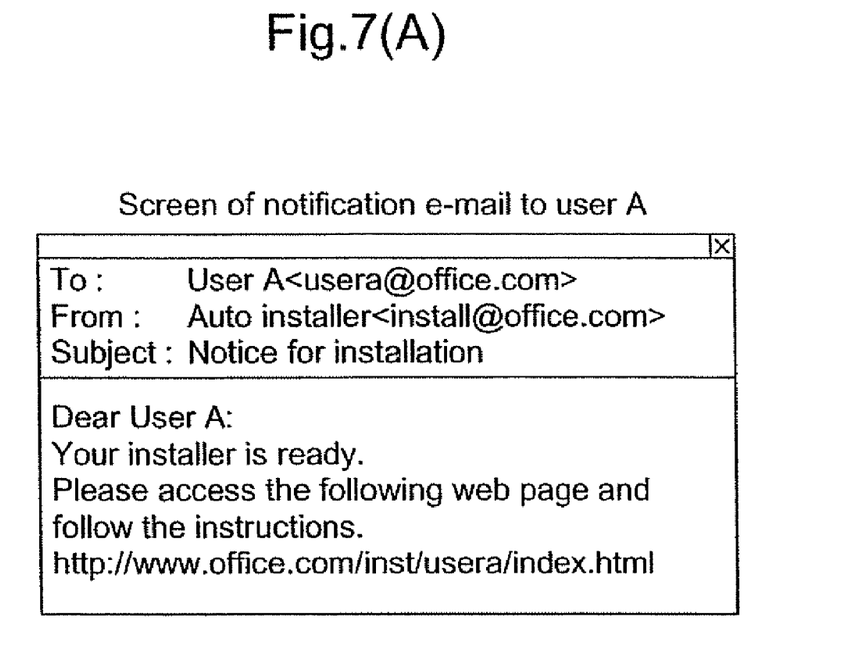
Figure 7B:
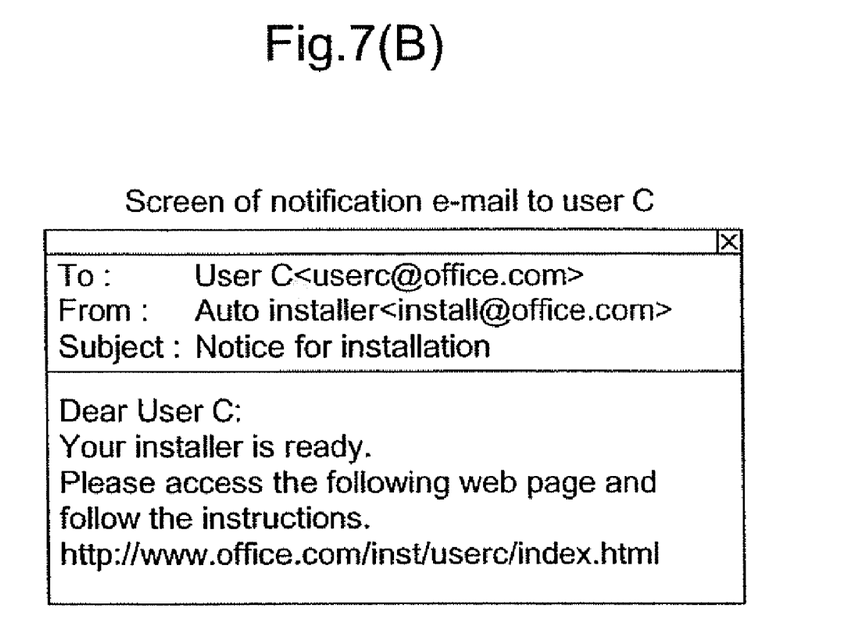

FIG. 7(A) shows a screen displaying an address notification e-mail on the user terminal of user A shown in FIG. 2. FIG. 7(B) shows a screen displaying an address notification e-mail on the user terminal of user C shown in FIG. 2. The address notification e-mail is used to notify a user of an address (URL) of a user-specific web page. As shown in FIG. 3, the address notification e-mail is created at server 5 in Step 204, transmitted to user terminal 1 in Step 205, and received at user terminal 1 and displayed on a monitor in Step 301.

The address notification e-mail includes a text prompting a user to access a user-specific web page and includes an address of the user-specific web page.

Figure 8:
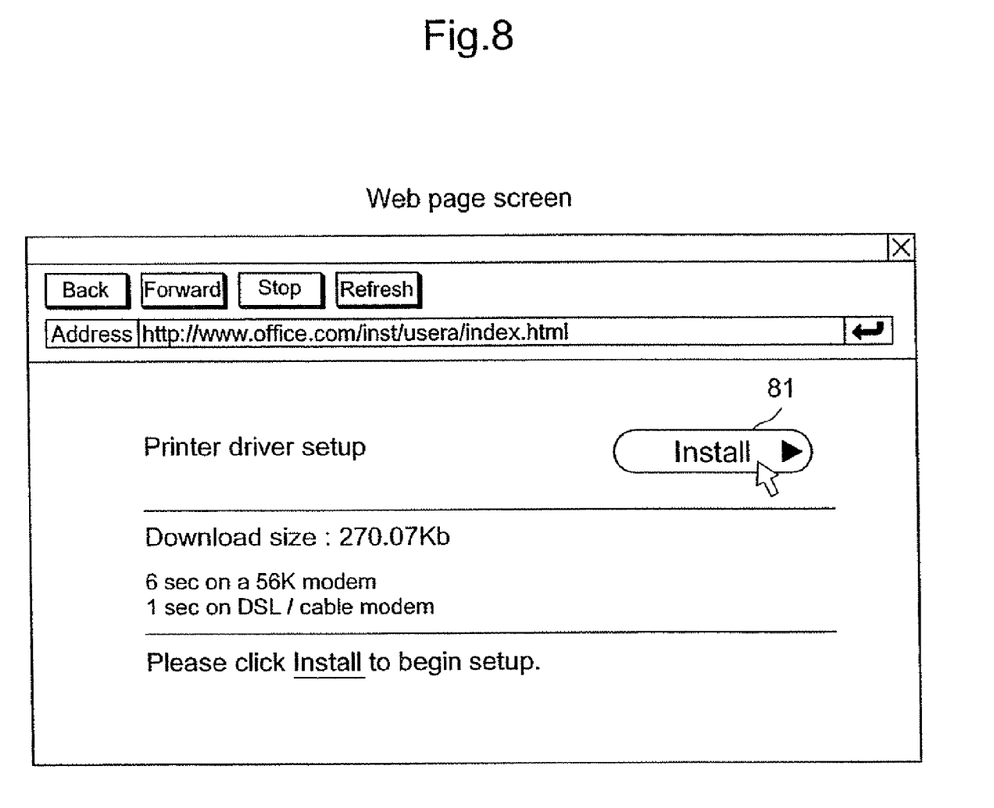
FIG. 8 shows a screen displaying a user-specific web page on one of the user terminals shown in FIG. 2.

FIG. 8 shows a screen displaying a user-specific web page on one of the user terminals shown in FIG. 2. The user-specific web page is utilized for performing a user-specific download of required programs and data. As shown in FIG. 3, the user-specific web page is created in Step 204 and published in Step 206 at server 5. The user-specific web-page is displayed on a monitor of user terminal 1 in Step 302 by using a web browser of user terminal 1 to access server 5 according to the address (URL) specified in the address notification e-mail.

The user-specific web page includes install button (Install) 81 for downloading and installing required programs and data, and a text prompting a user to start the installation process.

Figure 9:
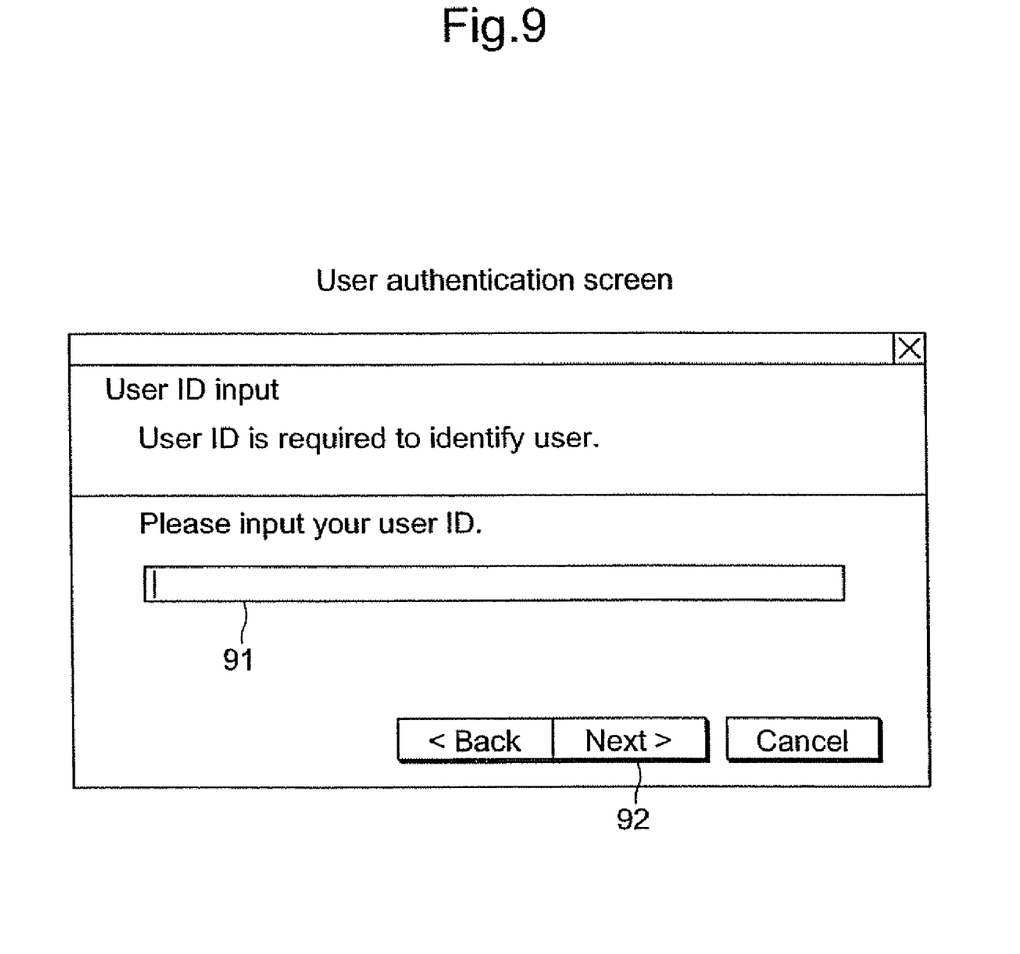
FIG. 9 shows a screen displaying a user confirmation on one of the user terminals shown in FIG. 2.

FIG. 9 shows a user authentication screen displayed on one of the user terminals shown in FIG. 2. The user authentication screen is utilized for performing a user authentication based on user identification information (User ID) assigned beforehand to a user, in order to restrict downloading of required programs and data to authorized users. By clicking install button 81 on the user specific web page shown in FIG. 8, the user authentication screen is popped up on a monitor of user terminal 1 in Step 303 shown in FIG. 3.

The user authentication screen includes a text prompting a user to input user identification information (User ID) of the user, and entry field 91 for inputting the user identification information. Once user identification information is inputted in entry field 91 and "Next" button 92 is clicked, a user authentication is performed by user authentication unit 17 based on the input user identification information. Once the user authentication is successfully completed, required programs and data are downloaded to and installed in the user terminal.

Figure 10:
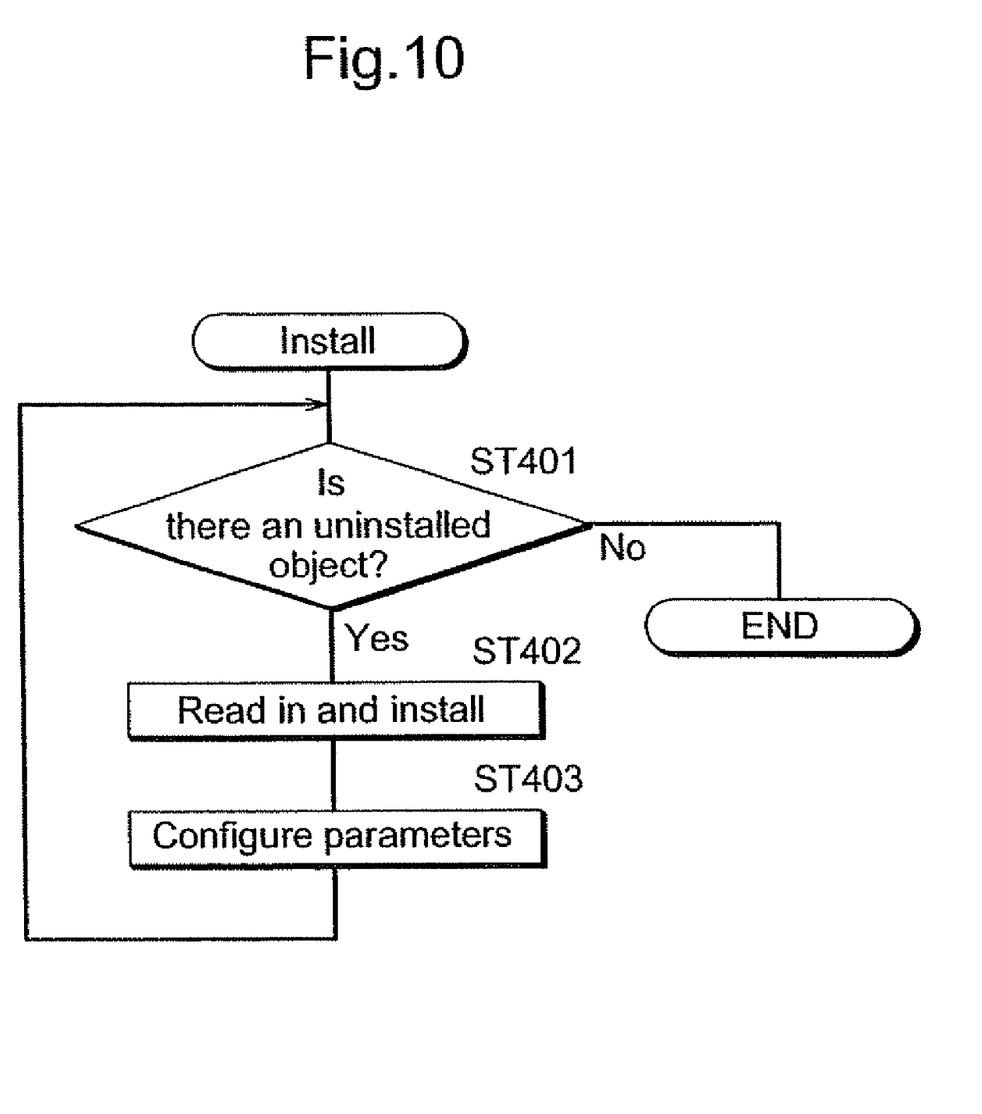
FIG. 10 is a flow chart describing installation procedures performed at the user terminal shown in FIG. 3.

FIG. 10 is a flow chart describing installation procedures performed at the user terminal shown in FIG. 3. When installing device drivers and application softwares at user terminal 1, it first searches for uninstalled device drivers and application softwares, and then all device drivers and application softwares specified in the user-specific configuration file are installed on the user terminal.

In the current example, it is first determined whether there are uninstalled device drivers and application softwares among those specified in a user-specific configuration file (Step 401). When there is an uninstalled device driver or an application software, an installer for the device driver or application software is read in and an installation process is started (Step 402). A process to configure parameters required for building a use environment is also performed (Step 403). These processes are repeated until all device drivers and application softwares specified in the user-specific configuration file are installed.

It is also preferred that, in the process of detecting uninstalled device drivers and application softwares, device drivers and application softwares of old versions are also searched and replaced with new versions.

Figure 11:
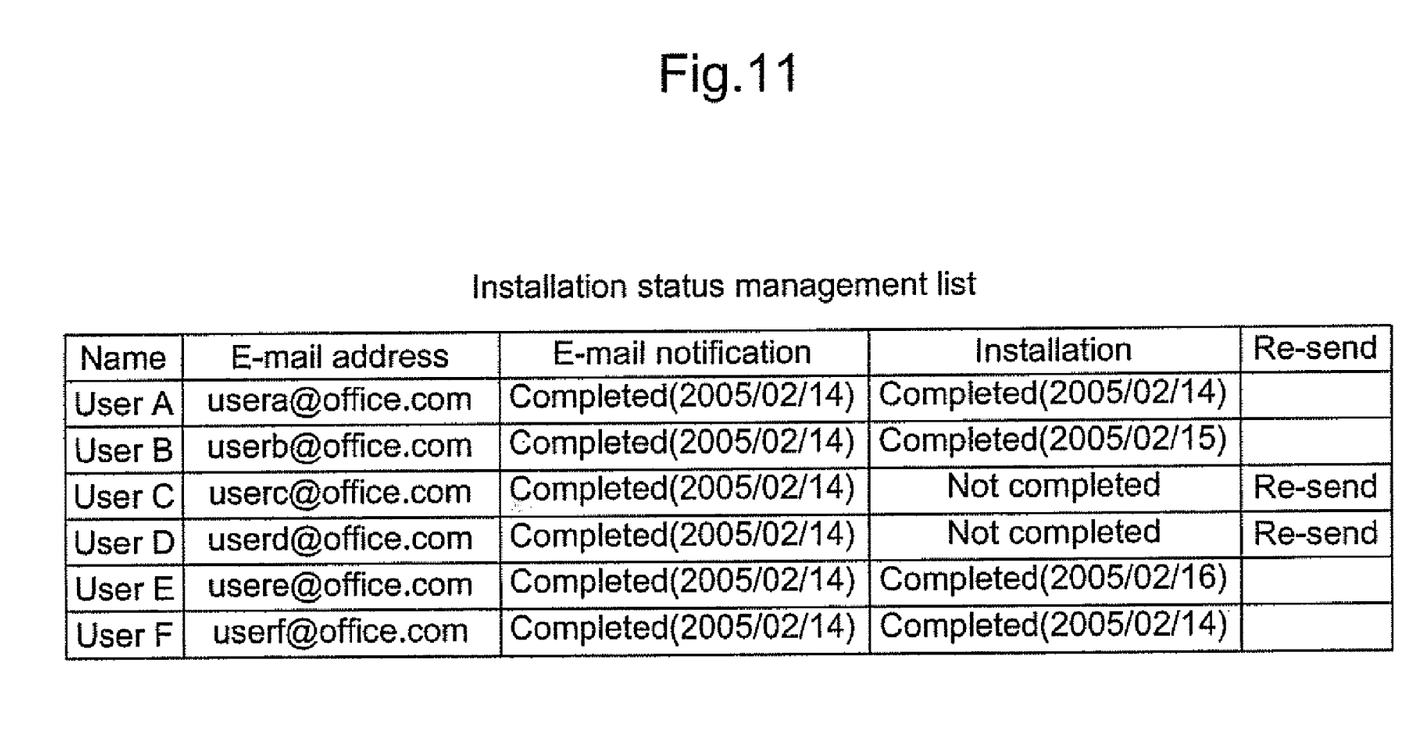
FIG. 11 shows the content of an installation status management list created at the server shown in FIG. 2.

FIG. 11 shows the content of an installation status management list created at the server shown in FIG. 2. The installation status management list is utilized for managing installation status of device drivers and application softwares at user terminals 1, and is created by installation status management unit 16 of server 5 based on a transmission log of address notification e-mails to user terminals 1, which is collected from e-mail transmission unit 13, and based on an access log of user-specific web pages from user terminals 1, which is collected from web server unit 14.

Information contained in the installation status management list is published by web server unit 14. An administrator can confirm the content of the installation status management list by accessing a web page for management purpose from administrator terminal 6. Further, the web page for management purpose of web server unit 14 can accept from the administrator terminal 6 a retransmission instruction for retransmitting a predetermined e-mail to a user who has not completed the installation process. When such a retransmission instruction is given, a process is performed, in which the predetermined e-mail reminding a specified user to complete the installation is created by processing unit 12 and transmitted from e-mail transmitting unit 13 to the specified user.

It is also possible to have a configuration in which a completion report regarding installation of device drivers and application softwares at user terminal 1 is transmitted from user terminal 1 to server 5, and, based on the received completion report, the installation status at user terminal 1 is registered in the installation status management list. In this case, it is also possible to receive the completion report from user terminal 1 at web server unit 14 of server 5.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2005-096921 filed on Mar. 30, 2005 entire content of which is expressly incorporated by reference herein.

What is claimed is:

1. A server connected to an administrator apparatus, to a terminal of a predetermined user and to a plurality of imagers, each imager having at least one function mode, the server comprising:
   a memory configured to store a driver for each of the plurality of imagers, wherein the plurality of imagers include at least a monochrome printer having a monochrome printing function mode, and a color printer having a monochrome printing function mode, a color printing function mode, and a scanning function mode;
   a receiver configured to receive, from the administrator apparatus, an installation management list and a user management list,
      wherein the installation management list includes a listing of a plurality of predetermined devices, including a definition for each of the plurality of predetermined devices, with each definition identifying both an imager and a function mode, the plurality of predetermined devices including at least a monochrome printing device defined as the monochrome printer using the monochrome printing function mode, a first color printing device defined as the color printer using the monochrome printing function mode, a second color printing device defined as the color printer using the color printing function mode, and a third color printing device defined as the color printer using the scanning function mode, and
      wherein the user management list includes at least one of the plurality of predetermined devices, that the predetermined user is permitted to use, issued by the administrator apparatus;
   a controller configured to generate a configuration file for the predetermined user based on the installation management list and the user management list, the configuration file including at least one predetermined device of the plurality of predetermined devices that the predetermined user is permitted to use, and including the at least one linager function mode that the predetermined user is permitted to use; and
   a transmitter configured to transmit, to a terminal, a driver for the at least one imager and the configuration file for the predetermined user, whereby the terminal can install the driver for the at least one imager and can set the at least one function mode that the predetermined user is permitted to use at the at least one imager,
      wherein the configuration file further provides information specifying various operational parameters of the driver, and is referenced by the terminal when installers of the driver are executed.

2. The server according to claim 1, wherein the controller further generates a web page in which the driver for the at least one imager and the configuration file for the predetermined user are included, whereby the terminal can obtain, from the web page, the driver for the at least one imager and the configuration file for the predetermined user.

3. The server according to claim 2, wherein the web page includes a page for inputting a user ID of the predetermined user, and when the predetermined user is authenticated by the server, based on the user ID of the predetermined user, the transmitter transmits, to the terminal, the driver for the at least one imager and the configuration file for the predetermined user.

4. The server according to claim 2, wherein the controller further manages access from the terminal to the web page.

5. The server according to claim 1, wherein the controller further generates a web page in which the driver for the at least one imager and the configuration file for the predetermined user are included, and the transmitter transmits, to the terminal, a notification e-mail, the notification e-mail notifying the predetermined user of a URL indicating the web page, whereby the terminal can obtain, from the web page, the driver for the at least one imager and the configuration file for the predetermined user, using the URL included in the notification e-mail.

6. The server according to claim 5, wherein the controller further manages access from the terminal to the web page, and, when the web page has not been accessed by the terminal, the transmitter re-transmits the notification mail to the terminal.

7. The server according to claim 5, wherein the controller generates the configuration file, the web page, and the notification e-mail in response to a receipt of a command from the administrator apparatus.

8. The server according to claim 1, wherein the installation management list further includes at least one of identification information for each of the plurality of imagers, an IP address assigned to each of the plurality of imagers, and an installer path indicating a location of an installer for a driver for each of the plurality of imagers.

9. The server according to claim 1, wherein the user management list further includes at least one of information relating application software that the predetermined user is permitted to use, information relating to encrypted communication, and an e-mail address of the predetermined user.

10. The server according to claim 1, further including an installation status management list configured to manage installation status of imager drivers and application software at the terminal, the installation status management list including at least one of an e-mail address of a terminal and an indication whether or not an installation of a driver at the terminal was completed.

11. The server according to claim 1, wherein
   the memory stores a predetermined application software;
   the installation management list indicates the predetermined application software;
   the user management list indicates the predetermined application software that the terminal is permitted to use;
   the controller generates the configuration file for the predetermined user based on the installation management list and the user management list, the configuration file further including the predetermined application program that the terminal is permitted to use; and
   the transmitter transmits, to the terminal, the predetermined application software, whereby the terminal is configured to install the predetermined application program that the at least one imager is permitted to use.

12. A server connected to an administrator apparatus, to a terminal of a predetermined user, and to a plurality of imagers, each imager having at least one function mode, the server comprising:

a memory configured to store drivers for each of the plurality of imagers, wherein the plurality of imagers include at least a monochrome printer having a monochrome printing function mode, and a color printer having a monochrome printing function mode, a color printing function mode, and a scanning function mode, and at least one application software for at least one of the plurality of imagers;

a receiver configured to receive, from the administrator apparatus, an installation management list and a user management list, wherein the installation management list includes a listing of a plurality of predetermined devices, including a definition for each of the plurality of predetermined devices, with each definition identifying both an imager and a function mode, the plurality of predetermined devices including at least a monochrome printing device defined as the monochrome printer using the monochrome printing function mode, a first color printing device defined as the color printer using the monochrome printing function mode, a second color printing device defined as the color printer using the color printing function mode, and a third color printing device defined as the color printer using the scanning function mode, and the installation management list also includes a predetermined application program that a terminal, is permitted to use, issued by the administrator apparatus, and wherein the user management list includes at least one of the plurality of predetermined devices, that the predetermined user is permitted to use, issued by the administrator apparatus;

a controller configured to generate a configuration file for the predetermined user based on the installation management list and the user management list, the configuration file including the at least one predetermined device, of the plurality of predetermined devices, that the predetermined user is permitted to use, including at least one function mode of the at least one predetermined device that the predetermined user is permitted to use, and including the predetermined application program that the at least one predetermined device is permitted to use;

a transmitter configured to transmit, to the terminal, a driver for the at least one imager, the predetermined application software, and the configuration file for the predetermined user, whereby the terminal can install the driver for the at least one imager and the predetermined application program, and can set the at least one function mode of the at least one predetermined device that the predetermined user is permitted to use by the administrator apparatus, and wherein the configuration file further provides information specifying various operational parameters of the driver, and is referenced by the terminal when installers of the driver are executed.

13. The server according to claim 12, wherein the installation management list further includes at least one of identification information for each of the plurality of imagers, an IP address assigned to each of the plurality of imagers, and an installer path indicating a location of an installer for a driver for each of the plurality of imagers.

14. The server according to claim 12, wherein the user management list further includes at least one of information relating application software that the predetermined user is permitted to use, information relating to encrypted communication, and an e-mail address of the predetermined user.

15. The server according to claim 12, further including an installation status management list configured to manage installation status of imager drivers and application software at the terminal, the installation status management list including at least one of an e-mail address of a terminal and an indication whether or not an installation of a driver at the terminal was completed.

16. A system, comprising:

a terminal configured to be used by a predetermined user;

a plurality of imagers, each imager having at least one function mode, configured to be used by the terminal;

an administrator apparatus configured to generate an installation management list and a user management list, wherein the installation management list includes a listing of a plurality of predetermined devices, including a definition for each of the plurality of predetermined devices, with each definition identifying both an imager and a function mode, the plurality of predetermined devices including at least a monochrome printing device defined as the monochrome printer using the monochrome printing function mode, a first color printing device defined as the color printer using the monochrome printing function mode, a second color printing device defined as the color printer using the color printing function mode, and a third color printing device defined as the color printer using the scanning function mode, and wherein the user management list includes at least one of the plurality of predetermined devices, that the predetermined user is permitted to use;

a server apparatus comprising:

a memory configured to store drivers for each of the plurality of the imagers, wherein the plurality of imagers include at least a monochrome printer having a monochrome printing function mode, and a color printer having a monochrome printing function mode, a color printing function mode, and a scanning function mode;

a receiver configured to receive, from the administrator apparatus, the installation management list and the user management list;

a controller configured to generate a configuration file for the predetermined user based on the installation management list and the user management list, the configuration file including the at least one predetermined device, of the plurality of predetermined devices, that the predetermined user is permitted to use, and including the at least one function mode that the predetermined user is permitted to use;

a transmitter configured to transmit, to the terminal, a driver for the at least one imager and the configuration file for the predetermined user, whereby the terminal can install the driver for the at least one imager and can set the at least one function mode of the at least one imager, that the predetermined user is permitted to use by the administrator apparatus, and wherein the configuration file further provides information specifying various operational parameters of the driver, and is referenced by the terminal when installers of the driver are executed.

17. The system according to claim 16, wherein the installation management list further includes at least one of identification information for each of the plurality of imagers, an IP address assigned to each of the plurality of imagers, and an installer path indicating a location of an installer for a driver for each of the plurality of imagers.

18. The system according to claim 16, wherein the user management list further includes at least one of information related application software that the predetermined user is permitted to use, information relating to encrypted communication, and an e-mail address of the predetermined user.

19. The system according to claim 16, further including an installation status management list configured to manage installation status of imager drivers and application software at the terminal, the installation status management list including at least one of an e-mail address of a terminal and an indication whether or not an installation of a driver at the terminal was completed.

* * * * *